(12) United States Patent
Sullivan et al.

(10) Patent No.: US 11,238,544 B2
(45) Date of Patent: Feb. 1, 2022

(54) SYSTEM AND METHOD FOR EVALUATING THE TRUE REACH OF SOCIAL MEDIA INFLUENCERS

(71) Applicants: Dion Sullivan, Mill Valley, CA (US); Joshua Heenan, Oakland, CA (US); Roman Akulshin, Walnut Creek, CA (US); Eric Crook, San Francisco, CA (US)

(72) Inventors: Dion Sullivan, Mill Valley, CA (US); Joshua Heenan, Oakland, CA (US); Roman Akulshin, Walnut Creek, CA (US); Eric Crook, San Francisco, CA (US)

(73) Assignee: MSM Holdings PTE, Singapore (SG)

( * ) Notice: Subject to any disclaimer, the term of this patent is extended or adjusted under 35 U.S.C. 154(b) by 1038 days.

(21) Appl. No.: 15/886,523

(22) Filed: Feb. 1, 2018

(65) Prior Publication Data

US 2019/0012746 A1    Jan. 10, 2019

Related U.S. Application Data

(60) Provisional application No. 62/529,985, filed on Jul. 7, 2017.

(51) Int. Cl.
| | | |
|---|---|---|
| *G06N 20/00* | (2019.01) | |
| *G06Q 50/00* | (2012.01) | |
| *G06N 5/00* | (2006.01) | |
| *G06N 20/20* | (2019.01) | |
| *G06N 3/04* | (2006.01) | |

(52) U.S. Cl.
CPC ............ *G06Q 50/01* (2013.01); *G06N 5/003* (2013.01); *G06N 20/00* (2019.01); *G06N 20/20* (2019.01); *G06N 3/0445* (2013.01)

(58) Field of Classification Search
USPC ......................................................... 706/15
See application file for complete search history.

(56) References Cited

U.S. PATENT DOCUMENTS

| | | |
|---|---|---|
| 9,485,318 B1 | 11/2016 | Harris et al. |
| 2006/0195441 A1 | 8/2006 | Jullia et al. |
| 2009/0281981 A1 | 11/2009 | Chen et al. |
| 2010/0312769 A1 | 12/2010 | Bailey et al. |
| 2010/0332330 A1 | 12/2010 | Goel et al. |
| 2011/0188715 A1 | 8/2011 | Shotton et al. |

(Continued)

*Primary Examiner* — David R Vincent
(74) *Attorney, Agent, or Firm* — Eandi Fitzpatrick LLP

(57) ABSTRACT

A non-transitory computer readable storage media having computer-executable instructions, when executed by a processor, performs a method for evaluating a reach of a social media influencer. The methods provides for receiving a plurality of influencers at a server, wherein a data set is associated with each of the plurality of influencers; parsing the data set into quantitative data readable by a machine learning algorithm at the server; receiving, inputting, or both, a type of product or service at the server; classifying the type of product or service into at least one class of goods or services; training a node using the machine learning algorithm using the date set an input; and executing the machine learning algorithm to determine a score of each influencer for each class of goods or services. Systems for evaluating the reach of a social media influencer as it relates to advertisers and content is also disclosed herein.

10 Claims, 8 Drawing Sheets

(56) References Cited

U.S. PATENT DOCUMENTS

| | | |
|---|---|---|
| 2012/0106800 A1 | 5/2012 | Khan et al. |
| 2012/0185544 A1 | 7/2012 | Chang et al. |
| 2012/0207359 A1 | 8/2012 | Konukoglu et al. |
| 2015/0059722 A1 | 3/2015 | Yang |
| 2015/0100538 A1* | 4/2015 | Chung ................ G06Q 10/101 706/52 |
| 2015/0317564 A1* | 11/2015 | Chen ................ G06Q 30/0204 706/52 |
| 2015/0370807 A1 | 12/2015 | Tseng |
| 2016/0007083 A1 | 1/2016 | Gurha |
| 2016/0196561 A1* | 7/2016 | Iyer ................ G06Q 30/016 705/304 |
| 2018/0012153 A1* | 1/2018 | Hu ................ G06Q 10/04 |
| 2018/0204243 A1* | 7/2018 | Haaland ............ G06Q 30/0251 |

* cited by examiner

SYSTEM AND METHOD FOR EVALUATING THE TRUE REACH OF SOCIAL MEDIA INFLUENCERS

CROSS-REFERENCE TO RELATED APPLICATIONS

This application claims the benefit of U.S. Provisional Application No. 62/529,985 entitled System and Method for Determining Real Social Media Footprint, filed on Jul. 7, 2017.

FIELD OF THE INVENTION

The present invention relates generally to marketing management systems and methods. More particularly, the present invention relates to certain new and useful advances in computer-based systems utilizing machine learning methodologies and social media metrics found across a variety of social networks (e.g., YouTube®, Instagram®, Facebook®, Twitter®) that can be used by companies to determine the best social media influencer to hire to promote its brand that would provide them with the greatest return on their investment; reference being had to the drawings accompanying and forming a part of the same.

BACKGROUND

Social media is the use of web-based technologies, computers and mobile technology (e.g., smartphones) to create highly interactive platforms through which individuals, communities and companies can share, create, discuss and modify user-generated content or pre-made content already posted online. The advent of social media has introduced many changes to the way companies and individuals communicate.

Social media differs from traditional forms of media such as paper and TV broadcasting in many ways, including larger reach, frequency, usability, immediacy and permanence. Social media involves a large number of users that interact socially with one another and in which such users can freely express and share opinions among themselves.

It can be argued that social media truly came to age in the early 2000s, with the advent of social networking sites MySpace® and Facebook. From 2005-2009, MySpace was the largest social networking site in the world, and even surpassed Google® as the most visited website in the United States in June 2006. However, due to quickly changing cultural and social atmosphere, as well as advances to technology, Facebook overtook Myspace in 2008 and has continued its upward climb ever since.

According to Facebook, there are over 1.86 billion monthly users worldwide as of Feb. 1, 2017, a 17% increase over 2016. Daily, there are 1.15 billion users who log into Facebook on their mobile devices. On average, five new Facebook accounts are created every second and individuals spend about 20 minutes a day on Facebook. Facebook is not the only social media giant these days, however.

Other largely popular social media websites include content communities (e.g. Instagram®, Pinterest®, YouTube & Snapchat®), blogs and microblogs (e.g. Twitter), virtual game worlds (e.g., World of Warcraft®), and virtual social worlds (e.g., Second Life®). Social media companies have grown so large that they are actually going public now, such as Snapchat.

The benefits of social media aren't limited to the users' ability to freely share content and opinions; marketers and brands have benefited greatly from the advent of social media, as web based social media can be used to generate data regarding products, services, brands, competition, and industries to better target your customer base to actively influence customer consumption patterns. Because of the power of social media, those individuals who have a greater impact on consumer's consumption decisions may be treated as a powerful promoter and/or an influencer (commonly referred to as a "social media influencer" or "influencer"), and their opinions may thus determine the market's acceptance of a certain product or brand.

However, sometimes it may be chaotic for a business, advertiser or marketer, to find the right social media influencer to utilize for a specific campaign because there may be hundreds of social media influencers that any one business, advertiser or marketer can choose from and many different analytics that can be used to judge the influencing power of a social media influencer. Some clarity may be provided by setting campaign goals (e.g., reaching x amount of individuals) and then choosing a social media influencer that has the best likelihood to make that goal (e.g., a social media influencer who has a reach of x). However, such a system is extremely limited and not ideal in an ever-evolving digital marketing world where one data set never tells the whole story, especially when you attempt to evaluate an influencer's influencing power over multiple social media channels. As such, various tools have been developed to determine a social media influencer's actual influence, but unfortunately, they still leave much to be desired.

For example, current tools designed to calculate the ability of a potential individual to serve as an influencer, such as Radian6, Sysomos, and Klout, provide algorithms that score and rank a user's influence in a social network based upon a single score value without any insight towards the success of certain content or topics discussed or posted by that individual. Instead, the algorithms take into account items such as the network metrics (e.g., number of followers, page rank) or an activity-centric metric in the social network (e.g., frequency of posts, responses, number of likes or comments within user's direct connections, etc.). By failing to take into considering the topical context, brands do not get a true indication of the likelihood of customer adoption of the messages given by their potential influences. Advances in technology, however, may help to solve many of these issues.

For example, data mining is a technique by which hidden patterns may be found in a group of data. Typically implemented as software or in association with database systems, data mining does not just change the presentation of data but actually discovers previously unknown relationships among the data. Normally, data mining models are generated based on one or more data analysis algorithms. Initially, the models are "untrained" but are then "trained" by processing training data generated information that defines the model. The generated information is then deployed for use in data mining, for example, by providing predictions of future behavior based on specific past behavior.

Data mining, however, is a computer intensive and complex tasks. Furthermore, data mining in the social media context requires the mining of very large datasets, which may include millions of records. In such a scenario, it may take hours or even days to build a single model based on such a dataset. Current systems that perform data mining analysis tend to provide inadequate performance for large datasets, and in particular, do not provide scalable performance, as a wide variety of models must be generated to meet specific yet widely different needs.

In addition, current systems do not provide adequate integration with multiple databases and otherwise provide limited flexibility in terms of specifying and adjusting the model being built to meet specific needs. Likewise, the various models that are built must be arranged so as to operate properly on the particular system for which the models were built. Current systems provide limited model arrangement and export capability.

With that being said, classification is a statistical process used to partition a collection of items (e.g., social media network metrics) into homogeneous classes according to their measurable characteristics or features. Generally, a typical classifier is first trained via machine learning techniques to recognize and label key patterns in a set of available training samples, and is then used to predict the class membership of future data.

One of the most recent advances in classification is the random forest (RF) methodology, which is a non-parametric ensemble approach to machine learning that uses bagging to combine the decisions of multiple classification trees to classify data samples. Of the many classifiers that have been developed, few have addressed the aforementioned issues as effectively as the RF, which has been demonstrated to be highly accurate, robust, easy to use, and resistant to over-training.

RFs address numerous issues that often times complicate and impact the effectiveness of other classification methodologies leveraged across diverse application domains. For example, the RF requires no simplifying assumptions regarding distributional models of the feature data and error processes. Thus, there are fewer restrictions on the applications and conditions in which the RF can be effectively applied. Moreover, it easily accommodates different types of data since there are no model parameters that must be estimated from the data. Hence, the RF can be viewed as a nonparametric classification/detection methodology, which is a highly desirable trait in modern statistical analysis.

Overall, advanced data mining techniques such as the use of RFs offer many advances in statistical analysis, especially when dealing with large data sets such as those often dealt with when examining social media statistics.

As such, a need exists for a system and method utilizing RF methodology to identify the best social media influencer for a specific campaign utilizing key performance indicators to judge a specific influencer's influencing power as well as metrics specific to the business objectives of the individual or company wishing to enlist the services of a social media influencer.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

To achieve the foregoing and other aspects and in accordance with the purpose of the invention, a system and method for evaluating and selecting social media influencers is presented.

Accordingly, it is an object of the present invention to provide a new and improved system and method that serves multiple purposes (e.g., Business to Business and business to consumer) and is user friendly.

Another object of the present invention is to provide a new and improved system and method for identifying influencers for social media marketing utilizing data features or key performance indicators (KPIs) to evaluate the social reach of an influencer.

Another object of the present invention is to provide a new and improved system and method to predict with a certain degree of accuracy which social media influencers will be the best match for a brand's media or advertising campaign.

Another object of the present invention is to provide a new and improved system to automatically identify and rank social media influencers using a random decision forest formed of a plurality of distinct, trained decisions trees. In addition, rather than merely using conventional social-media data features (e.g., how many followers does a user have, how many likes does each post receive) as the variables in the decision tree, non-conventional variables can also be used, such as the candidate's past history with other campaigns, the type of content it posts and its professional experience. Prioritizing the social media influences in such a manner is important to a business, advertiser and/or marketer to ensure that the candidate is the best fit to meet the brand's campaign goals while still being a good fit for the brand's overall vision and identity.

Another object of the present invention is to utilize the technological advances made in data mining and RFs to increase the efficiency and effectiveness of the system beyond what is currently possible.

Another object of the present invention is to provide a new and improved system and method that is easy and inexpensive to construct.

In exemplary embodiments, a non-transitory computer readable storage media having computer-executable instructions, when executed by a processor, performs a method for evaluating the reach of a social media influencer, the instructions comprising receiving a plurality of influencers at a server, wherein a data set is associated with each of the plurality of influencers; parsing the data set into quantitative data readable by a machine learning algorithm at the server; receiving, inputting, or both, a type of product or service at the server; classifying the type of product or service into at least one class of goods or services; training a node using the machine learning algorithm using the date set as an input; executing the machine learning algorithm to determine a score of each influencer for each class of goods or services.

In exemplary embodiments, a system for evaluating a reach of a social media influencer, the system having non-transitory computer-readable media comprising a program of machine executable instructions for a programmable computer system that, when executed by the programmable computer system, will cause the programmable computer system to execute instruction, the system comprising: a media processing module in communication with an influencer database, the media processing module configured to receive a plurality of influencers at a server, wherein a data set is associated with each influencer; a social media footprint estimator configured to parse the data set into quantitative data readable by a machine learning algorithm at the server; an influencer prioritization module configured to receive, input, or both, a type of product or service at the server, and to further classify the product or service into at least one of a plurality of classes; an influencer real footprint module comprising a machine learning module configured to train a node using the data set to identify the influencer's influence associated with selling the type of product or service input and to determine a score of each influencer for each product input.

A computer implemented influencer evaluation system, the system comprising: a server configured to receive a request for an influencer based on a product or service; a random forest tree generator that receives input data associated with an influencer and the product or service and generates a forest of decision trees based on the data set for the class of goods; a real social media module configured to determine a score of each influencer for the product or service.

Other features, advantages, and aspects of the present invention will become more apparent and be more readily understood from the following detailed description, which should be read in conjunction with the accompanying drawings.

DETAILED DESCRIPTION OF THE INVENTION

Figure 1:
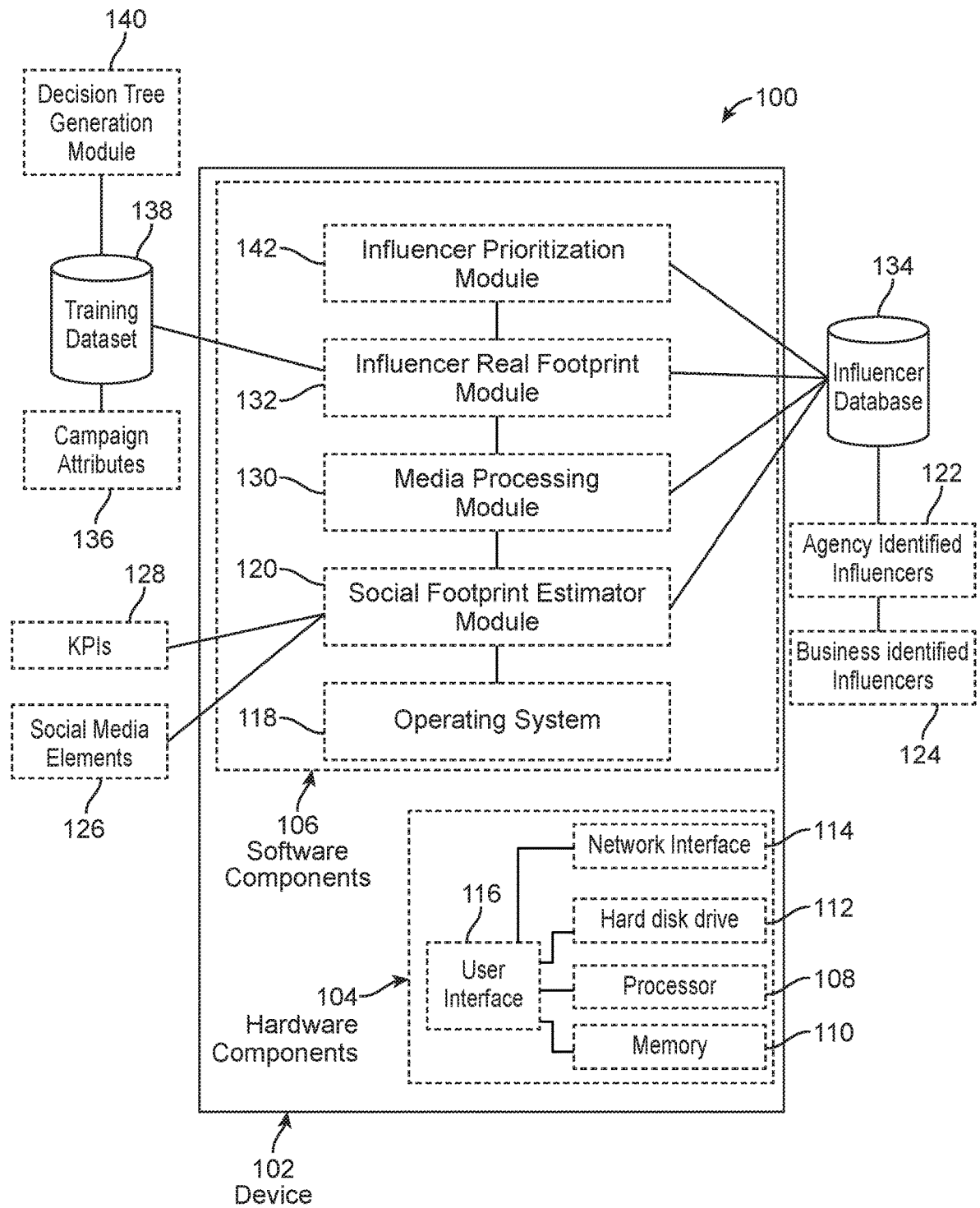
FIG. 1 is a diagram of an embodiment showing a computer system associated with a social media system for ranking social media influencers, in accordance with one embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described are shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

In one general aspect, the present invention is directed to computer-based systems and methods that prioritize social media influencers for an available marketing campaign based upon the probability that the social media influencer is the right fit for the business and for the available marketing campaign, as related to other potential social media influencers for the available marketing campaign. Machine learning is used, in some embodiments, a decision tree model is used to predict probabilities for each of the influencers relative to each other based on the marketing campaign that is the subject. A decision tree is a flowchart-like structure in which an internal node represents a test on an attribute or variable, with each branch coming out of the node representing the outcome of the test. The tree terminates in a number of leaf nodes (or leaves), which represent class labels, i.e., decisions taken after computing the attributes. In this case, the decisions are whether to hire or not hire the social media influencer based on their attributes. In particular, a Random Forest Algorithm (RFA), in which a great number of trees are generated and used for classification, is used to predict the hiring probabilities for the social media influencers. The resulting predicted probabilities can be used to prioritize the candidates.

As used herein, the term "influencer" shall mean a social media influencer, which is an individual or entity who operates a singular social media profile over one or more social media channels (e.g., Twitter®, Instagram®, YouTube®, Facebook®, Vine®, Snapchat®, Pinterest®). More specifically, influencers differ from the average individual or entity that operate a profile on one or more social media channels as they are the ones that build a core audience over multiple social media channels by creating relevant and entertaining content. Influencers are typical identified as those that have a large audience, can engage and adapt quickly to feedback, and have a diverse range of interests and unique offerings such that they are frequently partnering with other businesses to help promote and build the brand of the other business.

As used herein, the term "machine learning" may comprise any application of artificial intelligence (AI) that provides systems the ability to automatically learn and improve from experience without being explicitly programmed, or any type of an ensemble learning method for classification, regression and other tasks, that operate by constructing a multitude of decision trees at training time and outputting the class that is the mode of the classes (classification) or mean prediction (regression) of the individual trees.

As used herein, the term "social media elements" shall mean an influencer's content or content created on behalf of someone, comprising a post on any social media network, and includes but is not limited to, pictures, articles and/or videos.

As used herein, the term "user" shall mean any individual or business who uses the system to hire a social media influencer. More specifically, a user will either be an individual business owner, or it may be a third party marketing/advertising agency whom a business hires to assist in the process of hiring a social media influencer.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be also understood to refer to functional equivalents of such structures. The present invention will now be described in detail with reference to embodiments thereof as illustrated in the accompanying drawings. While reference is made to cellular phones, the present invention is applicable to other mobile devices such as e-readers, tablets, and the like.

A system and method that may rank, match and present information about a social media influencer is presented. In connection therewith, the process for training the decision trees for the machine learning algorithm is discussed and thereafter a process for using the trained decision trees for detecting, classifying and ranking indicators for a social media influencer is discussed.

Referring now to FIG. 1, a diagram of an embodiment of a computer-based system that may rank and present influencers, is shown generally at reference numeral 100. The embodiment 100 is a simplified example of a computer environment in which a ranking system may operate with various social media networks, the World Wide Web, and consuming applications. The embodiment 100 illustrates the functional components of a system. In some embodiments, the functional component may be a hardware component, a software component, or a combination of hardware and software. Some of the components may be application level software, while other components may be operating system level components. In some cases, the connection of one component to another may be a close connection where two or more components are operating on a single hardware platform. In other cases, the connection may be made over network connections spanning long distances and a plurality of nodes. Each embodiment may use different hardware, software, and interconnection architectures to achieve the described functions.

Still referring to FIG. 1, the device 102 may have a set of hardware components 104 and software components 106. The hardware components 104 may represent an architecture of a computing device, such as a desktop or server computer. In some embodiments, the device 102 may be a personal computer, network appliance, interactive kiosk or other device. The device 102 may also be a portable device, such as a laptop computer, netbook computer, personal digital assistant, mobile telephone, or other mobile device.

Still referring to FIG. 1, in the present embodiment the hardware components 104 may also include a central processing unit 108, random access memory 110, nonvolatile storage 112 and a network interface 114. The random-access memory 110 may store executable code as well as data that may be immediately accessible to the processor 108, while nonvolatile storage 112 may store executable code and data in a persistent stage. The network interface 114 may include hardwired and wireless interfaces through which the device 102 may communicate with other devices. The hardware components 104 may also include one or more user interface devices 116, which may include monitors, displays, keyboards, pointing devices, and any other type of user interface device. The use of the random access memory 110 will be further discussed in relation to FIG. 2.

Still referring to FIG. 1, in the present embodiment the software components 106 includes an operating system 118 on a non-transitory media on which various applications may execute as well as an influencer database 134 that contains a list of all potential social media influencers, either identified by the user 124 or by an agency 122, or in some embodiments, automatically sourced from a website or mobile application. As further discussed in connection with FIG. 2, in the current embodiment, the influencers may either be specific and known influencers identified by the business 202 who is interested in hiring an influencer, or may be sourced by a third party advertising/marketing agency 204 that the business 202 hires to assist in the process of identifying and sourcing the best potential influencer to utilize.

Still referring to FIG. 1, a social media footprint estimator module 120 gathers the social media elements (e.g., post of pictures, articles and/or videos) 126 and associated KPIs 128 for the influencers included within the influencer database 134. If necessary, a media processing module 130 may transform or parse the social media elements 126 stored in the influencer database 134 into quantitative data that can be analyzed by a machine learning algorithm as part of the influencer real footprint module 132.

Still referring to FIG. 1, an influencer real footprint module 132 computes the probability that the influencers presented in the influencer database 134 will be a good fit for the business and may assign a ranking or score to each of the potential influences. In this way, the operator may group certain kind s of businesses by like-kind, meaning make-up companies may be grouped as a species under cosmetics, electrician as a species of manual labor, soft drink companies as a species of retail food, and so on. The influencer real footprint module 132 assigns these rankings by utilizing user imputed data such as campaign attributes 136 (e.g., reach 1,000 people, make 1,000 sales, budget of only $100), as well as the specific data gathered regarding the influencer's social media elements 126 and associated features or KPIs 128, all of which is stored within the training dataset 138, and then processed using the decision tree generation module 140 to determine the ranking depending upon the product input. In operation, the decision tree generation module 140 will generate the forest of decision trees used in the Random Forest algorithm (RFA) based on the training dataset 138. Furthermore, historical influencer data for generating and training the decision trees (i.e., the "training dataset") may also be stored in the training dataset 138. Once the influencer real footprint module 132 analyzes the influencers, the influencer prioritization module 142 will rank and present the influencers in the influencer database 134 in order from likelihood of most impactful for the business's campaign to lease impactful. This is further discussed in relation to FIGS. 5-7.

As mentioned above, the influencer real footprint module 132 preferably uses the RFA to build an ensemble (or "forest") of decision trees that are used to prioritize the influencers in the influencer prioritization module 142. The RFA is a non-parametric ensemble approach to machine learning that uses bagging to combine decisions of multiple classification (or decision) trees to classify data samples, in this case the influencers for the available campaigns in terms of whether they are the right fit for the open campaign and the hiring business. More details about the RFA may be found in L. Breiman, "Random Forests," Machine Learning 45 (1):5-32 (2001) and A. Liaw et al., "Classification and Regression by Random Forest," R News, Vol. 2/3, p. 18 (2002), both of which are incorporated by reference. Generally speaking, machine learning comprises an intake or mining of data for training one or more deep learning algorithms. In the typical instance, either a business and/or a third party marketing/advertising agency will identify one or more datasets based on posted media and make a standard assumption on its reach based on certain data features or KPIs. The system data-mines such datasets, taking into consideration the specific campaign attributes 136, to extract a sufficient number of data within a specific category to train one or more deep learning algorithms. The process through which the decision tree generation module 140 generates the decision trees is further discussed in accordance with FIG. 3, FIG. 6 and FIG. 7.

The data mining needed to create a strong deep learning algorithm aims at surfacing and injecting vast amounts of data from users on social media whether automatically or semi-automatically, and therefore the decision tree generation module 140 is configured to analyze large quantities of data to extract patterns such as groups of data records (cluster analysis), unusual data (anomaly detection), and dependencies (association rule mining, sequential pattern mining). This usually involves using database techniques such as spatial indices. These patterns can then be seen as a kind of summary of the input data, and may be used in further analysis or, for example, in machine learning and predictive analytics.

In this way, influencers can be ranked by scoring their outreach in sectors X, Y, or Z (n+1) ranging from 0.0 for little to no outreach, to a maximum of 1.0 for maximum outreach based on vectors, as one example. The training data is an important component for the decision tree generation module 140 to be able to produce an accuracy score to determine an individual's likelihood to serve as a successful social media influencer for the particular brand. The algorithm can produce an accuracy score by comparing media, as encoded, to the vector space described by the positive training data related to the maximum social outreach, and minimal social outreach.

In optional embodiments, deep learning recurrent neural networks may use hidden computational nodes and various gates and may be self-tuning or user-tuning, in some embodiments. After the process of tuning, the algorithm will be evaluated to assess the degree to which it accurately identifies the media test data it has never encountered with the "vector space" it has been trained to recognize. This, over time, improves accuracy.

Figure 2:
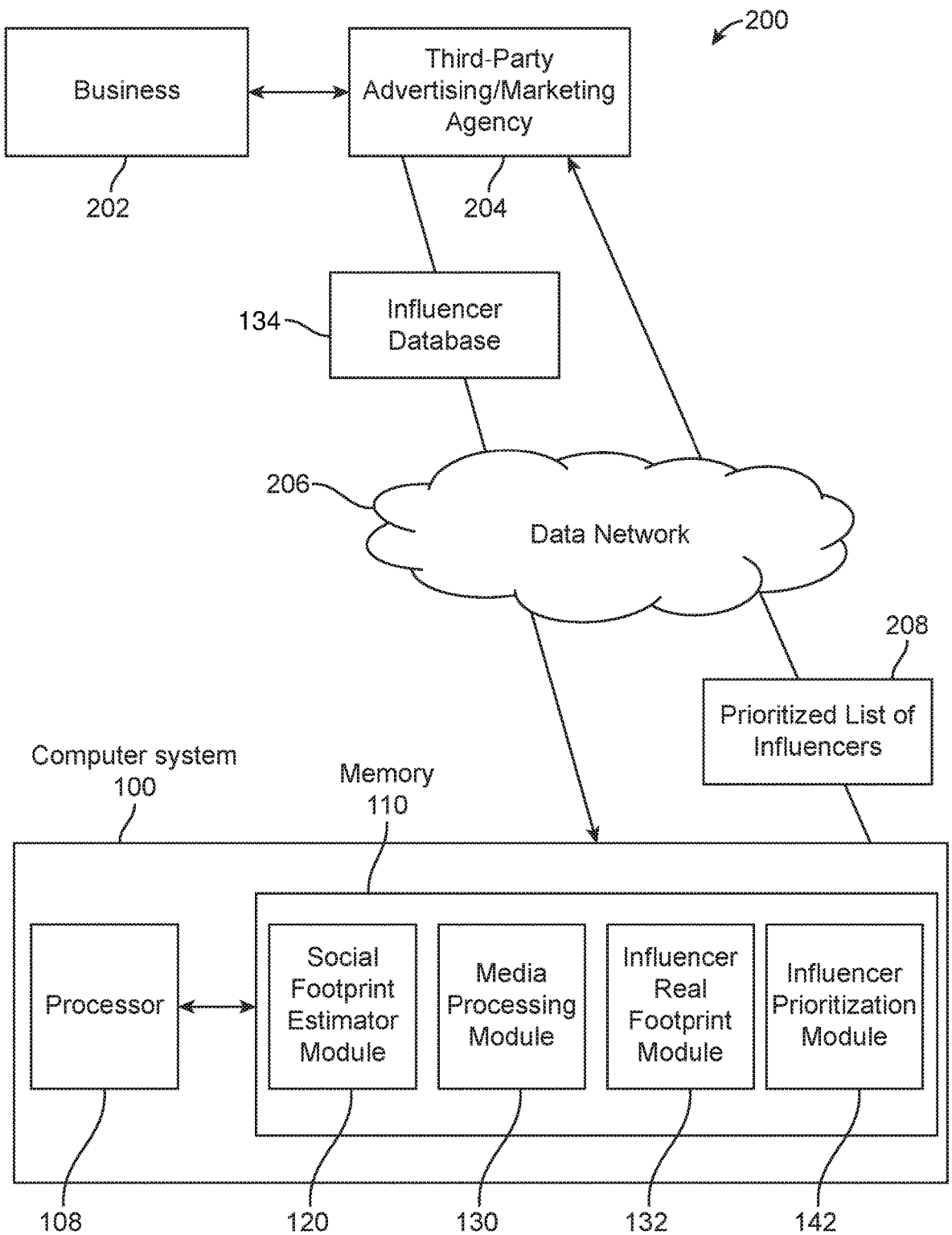
FIG. 2 is a diagram of a system for ranking social media influencers, in accordance with one embodiment of the present invention.

Referring now to FIG. 2, a simplified block diagram of an exemplary system for ranking social media influencers in accordance with one embodiment of the present invention, is shown generally at 200. In this diagram, suppose that a business 202 wishes to hire one or more influencers to help promote the business. In some instances, the business 202 may work with a third-party marketing and/or advertising company 204 to help determine the best influencer to hire to meet the business's needs, although such marketing/advertising company is not necessary. The business 202, and/or the third party advertising/marketing company 204, may use any suitable technique for developing the initial list of potential influencers that are stored within the influencer database 134. For example, it could create a list of potential influencers based strictly on the business's campaign attributes, or it could create a list based strictly on certain data features or KPIs found on social networks, or it could also compile a list of known influencers from previous campaigns or the business may already have a list of identified influencers they wish to utilize.

Still referring to FIG. 2, the third-party advertising/marketing agency 204 (or any other party, such as the business 202 if a third-party advertising/marketing agency is not used) transmits the influencer database 134, which contains the list of influencers, to the computer system 100, which was previously described in accordance with FIG. 1, via a data network 206. The data network 206 may be any suitable data network for transmitting such data files; preferably, this data network 206 would be an IP network such as the Internet, intranet, extranet, etc. It could also use other types of communication protocols, such as Ethernet, ATM, etc., and it could include wired and/or wireless links. The influencer database 134 is then used by the social footprint estimator module 120 to gather more data about the influencers (e.g., data features or KPIs and non-conventional data) for each of the influencers included within the influencer database 134. This information is then transformed, as may be necessary, into quantitative values through the media processing module 130 so that it may be read by the influence real footprint module 132, which uses machine learning to calculate influencer's likelihood of being a good match as the business's brand influencer. These calculations are then used to rank the influences in the influencer prioritization module 142. As such, some of the categories of information about the influencers may relate to nodes of the decision trees used to calculate the probability of the influencer being hired—these categories may include certain indicators and other non-conventional data such as:

Reach or distribution potential, such as number of fans and followers, number of times they are mentioned in other posts, their overall reach, email list growth, blog subscribers, and inbound link clicks;

Engagement and interaction potential, such as likes, comments, social media shares/retweets, forwarding, reviews, check-ins, contributors and active contributors, clicks on your links and page views, unique visitors from social media, sessions from social networking sites and the time spent thereon, average response times;

Influence potential, such as shares of the influencer's conversation vs its competitors, other businesses for which the influencer has acted as an influencer for or has otherwise advocated for, the satisfaction of any of its followers from such other businesses it has acted as an influencer for or has otherwise advocated for;

Creative information, such as the type of images and/or content they post, any particular causes they advocate for, any type of style found throughout their account, the type of brands and/or other accounts/individuals they most closely relate to;

Previous influencer programs, such as any companies they have worked with in the past as an influencer, the costs of those services, the amount and type of work provided (e.g., a single post, a story mention, only images, product reviews); and Personal information, such as place of birth and current place of residence, primary occupation and number of years it has worked in such occupation.

The computer system 100 then transmits a prioritized list of influencers 208 tanking the probability that the influencers will be a good match back to the third-party marketing/advertising agency 204 (or any other party, such as the business 202 if a third-party advertising/marketing agency is not used) via the data network 206 (or a different data network).

Still referring to FIG. 2, as well as the computer system presented in FIG. 1, the memory 110 may store the software that is executed by the processor 108. In particular, the memory 110 may store the social footprint estimator module 120, the media processing module 130, the influencer real footprint module 132 and the influencer prioritization module 142.

Figure 3:
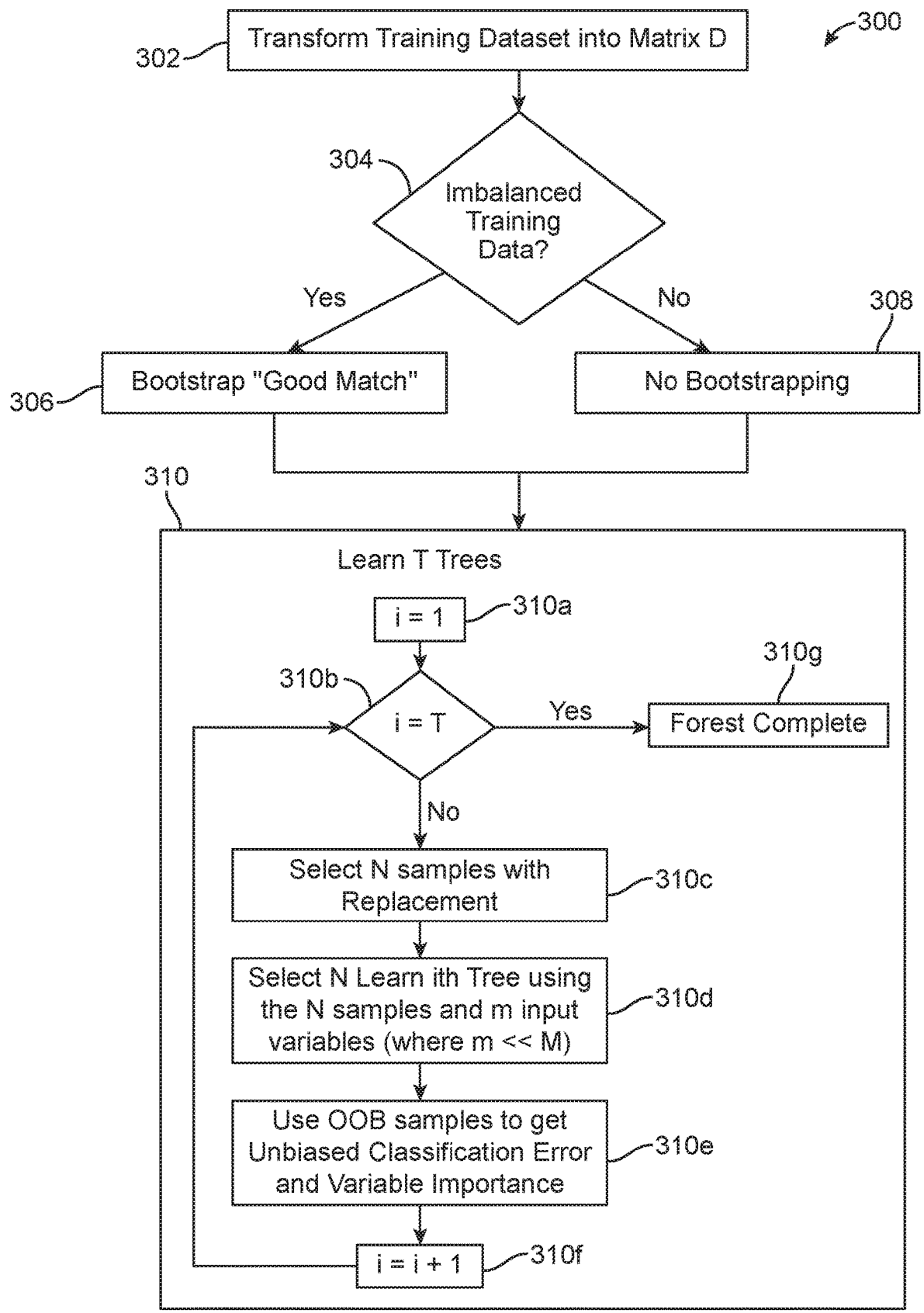
FIG. 3 is a schematic diagram of an example portion of a RF decision tree, in accordance with one embodiment of the present invention.

Referring now to FIG. 3, a flowchart of a process for generating the forest of decision trees in accordance with one embodiment of the present invention, is shown generally at 300. Firstly, in step 302 the training dataset 138 is transformed into actionable numeral values (if not already done so). This step 302 may include generation of a N×M data matrix, denoted D, where each of the N rows represents one influencer in the training dataset 138 and each column M represents one input variable used in the classification. In the present embodiment, the input variables are the KPIs and other non-conventional categories of data such as: the number of fans and followers, number of times they are mentioned in other posts, their overall reach, email list growth, blog subscribers, and inbound link clicks; the influencer's conversation vs its competitors, other businesses for which the influencer has acted as an influencer for or has otherwise advocated for, the satisfaction of any of its followers from such other businesses it has acted as an influencer for or has otherwise advocated for; the type of images and/or content they post, any particular causes they advocate for, any type of style found throughout their account, the type of brands and/or other accounts/individuals they most closely relate to; the number of likes, comments, social media shares/retweets, forwarding, reviews, check-ins, contributors and active contributors, clicks on your links and page views, unique visitors from social media, sessions from social networking sites and the time spent thereon, average response times; any companies they have worked with in the past as an influencer, the costs of those services, the amount and type of work provided (e.g., a single post, a story mention, only images, product reviews); and personal information of the influencer such as place of birth and current place of residence, primary occupation and number of years it has worked in such occupation. In particular, input variables that have found to be important in the realm of social media influencers include: the number of fans and followers the influencer has; the number of likes and comments the influencer's posts receive, as well as the number of shares/mentions; the total reach of the influencer; the similarity of the content the influencer posts as compared to the brand's image; and the influencer's previous history serving as an influencer and/or brand ambassador for other businesses.

In the present embodiment, a training dataset encompassing specific campaign attributes specific to the business is used. In such situations, the training dataset can be gathered directly from the business. In optional embodiments, however, a training dataset that is not specific to the business is used. In such cases, historical training data of other influencer programs ran by marketing/advertising agencies can be aggregated and used to construct the trees. In either case, larger training datasets are generally better and lead to better classifiers, all other things being equal. Also, in either case the number of influencers that may be "Good Matches" may be much smaller than the number of influencers deemed "Bad Matches," which can result in an unsatisfactorily imbalanced dataset. Accordingly, at step 304 the training dataset is examined to see if it is unsatisfactorily imbalanced. That is, for example, if the ratio of good matches to bad matches is less than a threshold value (e.g., 1:10), then at step 306 the training dataset can be resampled (e.g., bootstrapped) until it is at an acceptable level (e.g., between 1:10 and 1:5). Conversely, if the ratio of good matches to bad matches in the training dataset is acceptable at step 304, no bootstrapping is required as donated by step 308.

A goal of the trained decision forest is to determine which influencers will offer the best return on investment (ROI) for a business's social media campaign based upon certain KPIs and specific campaign attributes, and therefore the machine learning system is trained to identify certain influencers as either good or bad matches. Thus, the good and bad match examples are generated from Matrix D.

Still referring to FIG. 3, at step 310, a large number, denoted T, of decision trees (e.g., a forest) are generated based on the training dataset 138. Historical influencer data for influencers that are known to have successful campaigns in the class based upon commercial success may be input as a training dataset 138. Influencers that are added to the system (i.e., additional influencers) can be compared to past influencers to generate generating vector spaces and generate the score ranging from 0.0 to 1.0 for the additional influencers for each class.

As previously discussed, random decision forest is a collection of deterministic decision trees that can be used in classification algorithms, but which also suffer from over-fitting and in-turn leads to poor generalization. However, an ensemble of many randomly trained decision trees (a random forest) yields improved generalization. During the training process, the number of trees is fixed. In one embodiment, the number of trees may be 100, although larger values such as 250 or 500 may be used. Each of the trees splits the training dataset 138 into subsets based on an attribute value test, and gives a classification (e.g., "good match" or "bad match"). When predicting the probability, each input row vector (which corresponds to a candidate in the training set) is put down each of the trees in the forest and gets a vote for "Good Match" or "Bad Match." The probability of an influencer being either a good or bad match for a particular brand's campaign is calculated by taking the number of votes for Good Match for the influencer and dividing it by the total number of trees in the forest.

Figure 4:
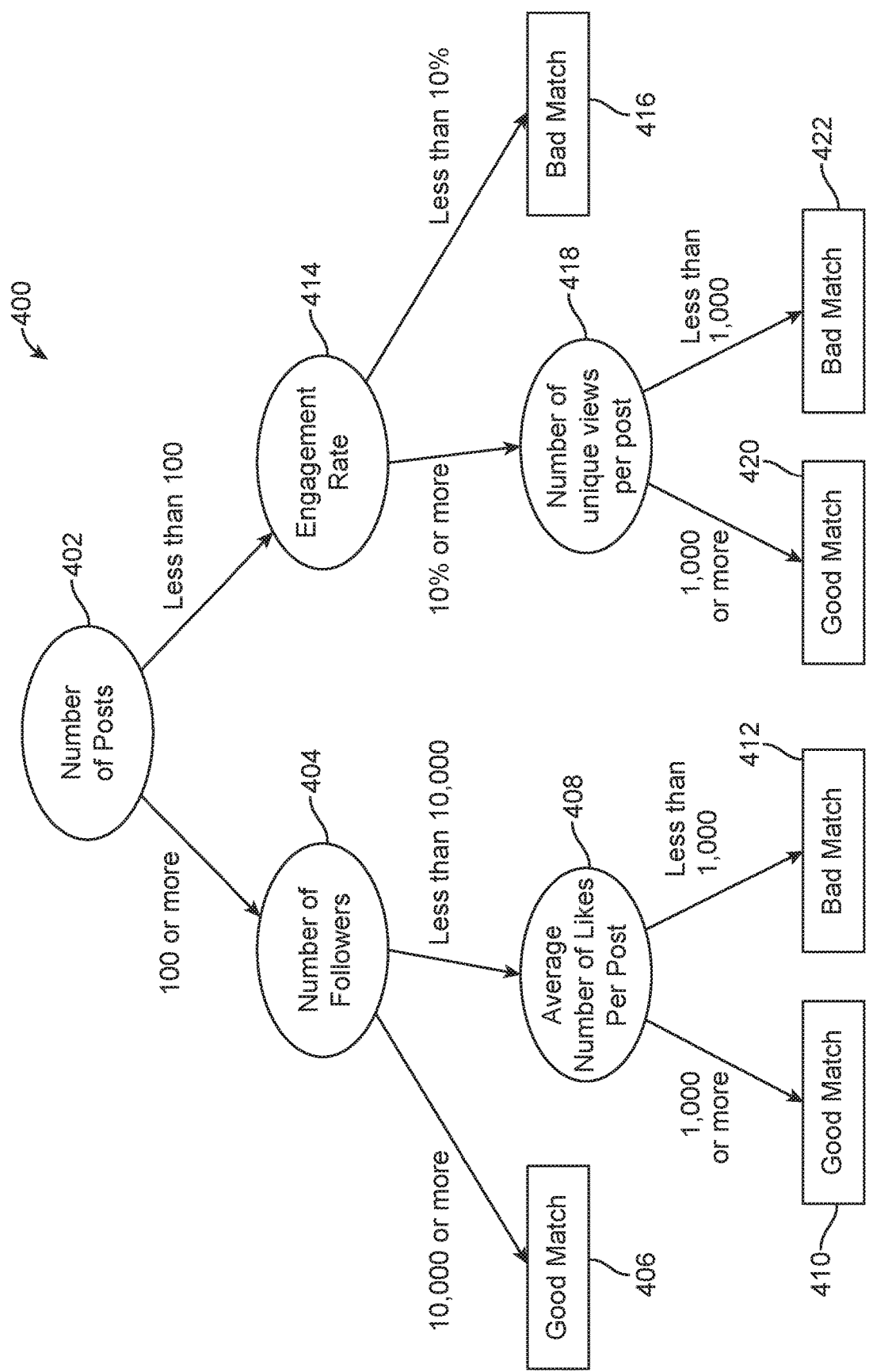
FIG. 4 is a flowchart illustrating the process for training a decision forest to identify features in certain social media statistics, in accordance with one embodiment of the present invention.

Referring now to FIG. 4, an example of a possible decision tree in accordance with one embodiment of the present invention, is shown generally at 400. In this example, the root node 402 is the "Number of Posts." If the influencer has 100 posts or more, the tree branches to the left to the "Number of Followers" node 404. Here, if the influencer has 10,000 followers or more, the tree branches to the left to a "Good Match" leaf 406. Going back to the "Number of Followers" node 404, if the influencer has less than 10,000 followers, the tree branches to the right to the "Average Number of Likes Per Post" node 408. Here, if the influencer averages 1,000 or more likes per post, the tree branches to the left to a "Good Match" leaf 410. Conversely, if the influencer averages less than 1,000 likes per post, the tree branches to the right to a "Bad Match" leaf 412.

Going back to the root node 402, if the influencer has less than 100 posts, the process branches to the right to the "Engagement Rate" node 414. Here, in this example, if the influencer's engagement rate is less than 10%, then the tree branches right to a "Bad Match" leaf 416. However, if the influencer's engagement rate is equal to 10% or more, then the tree branches left to the "Number of Unique Views Per Post" node 418. Here, if the influencer has an average of 1,000 or more unique views per post, then the tree branches to a "Good Match" leaf 420. Conversely, if the influencer has less than 1,000 unique views per post, then the tree branches to a "Bad Match" leaf 422. The manner in which the parameters used by each of the split nodes are chosen and how the leaf node probabilities are computed is now described with reference to the remainder of FIG. 3.

Referring back to FIG. 3, as part of step 310, to generate the forest of T decision trees, a counter, denoted i, may be set initially to a value of 1 at step 310a. That counter is then tested to see if it equals T at step 315b to see if the desired number of trees for the forest has been built. If not, more trees need to be generated as the counter has not yet incremented to the value of T. So at step 310c, in various embodiments, the ith decision tree is learned. In this process, according to various embodiments, N sample points (same as the number of influencers (rows) in the matrix D) are selected at random with replacement from the training dataset 138 to be treated as the new "training dataset" for the specific tree. "With replacement" means that particular influencer samples can be selected multiple times to get to the N sample points, and some of the influencer samples are not selected at all. The samples that are not selected can be called the "out-of-bag" (or OOB) samples, and preferably about one-third of the original samples are left out. That is, the percentage of samples selected may be expected to be, or converge to, (1-1/e) or about 63.2%, when the total number of sample points goes to infinity. These OOB samples may be used to obtain an unbiased estimate of the classification error and variable importance for the decision tree, as described further below.

Still referring to FIG. 3, at step 310d the ith tree is learned. In various embodiments, an optimal number m, much less than M (the number of columns in the matrix D), of variables is decided by the algorithm, such that, at each node in the tree, starting from the top (or root node) and working down, m out of M input variables are selected at random and the best split (according to some criteria) on these m variables is used to split the node. "Best" is usually a measure of homogeneity of the target variables with the subsets, and any suitable technique may be used for determining the best split, such as Gini (population density), entropy, information gain ratio, the Chi-square test, or any other suitable technique.

Next, at step 310e the OOB samples are used to determine the unbiased classification error and variable importance of the ith tree. In various embodiments, the unbiased classification error can be determined by putting each OOB case left out in the construction of the ith tree down the ith tree to get a classification. In this way, a test set classification is obtained for each case in about one-third of the trees. At the end of the run, take j to be the class that got most of the votes every time case n was OOB. The proportion of times that j is not equal to the true class of n averaged over all cases is the OOB error estimate. The OOB error can be used to determine the best split. Also, the OOB can be used to determine the optimal value for m and the total number of trees to construct. The optimal number m and the total number of trees to construct. The optimal number m may be determined by, for example, initially setting it to M divided by 3 (or m=M/3), where M is the total number of columns in the D matrix. When turning m, at each iteration, m is inflated (or deflated) by a predetermined value (e.g., 2), and the iteration stops when the OOB error value does not improve by at least a threshold value (e.g., 0.05). Once m is chosen, m variables are selected randomly and uniformly on each sample to build the trees.

One way to assess the variable importance is with random permutation of the m variables. For example, for every tree grown in the forest, put down the OOB cases and count the number of votes cast for the correct class. The values of variable m can then be randomly permuted in the OOB cases and put the randomly permuted cases down the tree. The number of votes for the correct class in the variable-m-permuted OOB data is subtracted from the number of votes for the correct class in the untouched OOB data. The average of this number over all trees in the forest is the raw importance score for variable m. If the values of this score from tree to tree are independent, then the standard error can be computed by a standard computation, such as dividing the raw score by its standard error to get a z-score, and assign a significance level to the z-score assuming normality. If the number of variables is very large, forests can be run once with all the variables, then run again using only the most important variables from the first run. For each case, consider all the trees for which it is OOB. The percentage of votes or the correct class in the variable-m-permuted OOB data can be subtracted from the percentage of votes for the correct class in the untouched OOB data. This is the local important score for variable m in this case. With the ith tree complete, the counter i is incremented by 1 at step 310f, and the process returns t step 310b, where the counter i is again compared to T, the desired number of trees. If I does not equal T, the next tree is learned. On the other hand, if i equals T, the next tree is learned. On the other hand, if i equals T, then the forest is complete, shown at step 310g, meaning that the desired quantity of trees, T, is constructed. In growing the T trees according to this process, the value of m is preferable held constant to grow the entire forest (that is, each of the T trees is grown with the same value of m) and each decision tree preferably is grown to the largest extent possible without any pruning. In alternative embodiments, the step of determining the unbiased classification error and/or variable important (step 310e) may be performed as each tree is generated or it could be performed for each tree after all of the trees are generated (i.e., outside the loop), or combinations thereof (i.e., every x amount of trees). With the forest of decision trees generated, the influencer database 134 can be prioritized.

Figure 5:
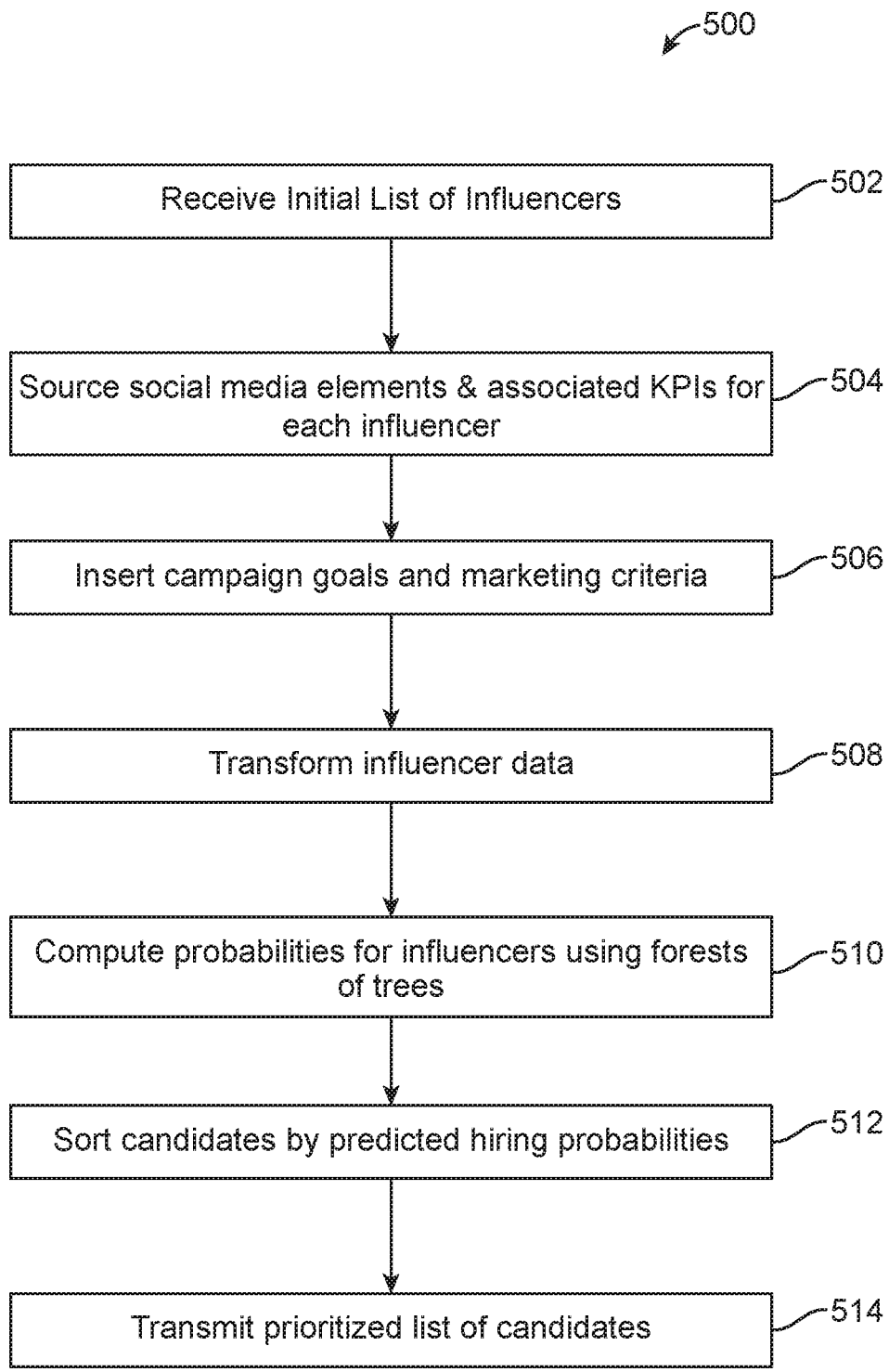
FIG. 5 is a flowchart depicting a process for prioritizing the influencers, in accordance with one embodiment of the present invention.

Referring now to FIG. 5, a flowchart of the process that may be performed to prioritize the influencers in the influencer prioritization module in accordance with one embodiment of the present invention, is presented generally at 500. At step 502 the computer system receives the list of influencers from the sender (e.g., the business and/or third-party marketing/advertising agency/internet) and then at step 504 the computer system sources the social media elements and associated indicators for each of the influencers listed. Next at step 506, the campaign attributes are entered into the system.

Still referring to FIG. 5, at step 508 the data for the influencers are transformed into a suitable form, preferably a N'×M' matrix, where N' is the number of influencers in the initial list and M' is the input variables (primes are used here to differentiate these values from the dimensions of the D matrix used to learn the forest of decision trees).

Still referring to FIG. 5, at step 510 the N'×M' matrix is put down each of the T trees in the forest to determine the probability for each candidate. This is done by averaging the outputs of the decision trees for each influencer. For example, if a particular influencer is classified as a Good Match for S of the T trees (and conversely, a Bad Match for T-S trees), or scores above a predetermined variable that influencer's probability is S divided by T (or S/T). Then, at step 512 the influencers can be prioritized by sorting them by their predicted match probabilities (computed at step 510) from highest probability to lowest probability. Then at step 514, the prioritized list of influencers 208 can be transmitted by the computer system 100 back to the intended recipient (e.g., the business 202 or the third-party advertising/marketing agent 204).

As mentioned above, variables other than the KPIs are used in various embodiments to classify and prioritize the influencers. These non-KPI variables can include, for example, personal characteristics (e.g., age, location, birth date, religious beliefs, personality test results), type of social media elements posted (e.g., moody images, colorful images, black & white images) and previous employment information (e.g., job experience outside of social media, success with other influencer programs). Thus, these variables can be associated with nodes for some of the decision trees of the forest.

As should be apparent from the above description, different training datasets will lead to different forests of decision trees. In particular, different variables or attributes will prove more significant in classifying the samples. For example, when a specific training dataset is used that is specific to the campaign attributes 136 for the business 202, then variables that are unique to those campaign attributes 136 are more likely to be used in the trees than if the trees were generated using a general training dataset. For example, if a business 202 is seeking to hire an influencer who may be based in California, and the trees are generated based on this condition, whether an influencer lives in California is more likely to be a node in the decision trees as opposed to if a general training data is used independent of the specific criteria of the business 202.

As another example, if a business 202 is seeking to hire an influencer who has at least 100,000 followers, and this condition is factored into the training, the number of social media followers for the influencer may prove to be an important factor (node) in classifying the influencers. Prioritizing the influencers in the manner described above is very important to the business 202. Many times, businesses 202 tend to use influencers simply because they have acted as an influencer for another company. Other times, businesses 202 are often competing against one another for the ability to have a specific influencer represent their brand. However, prioritizing influences based on the KPIs and specific campaign attributes for a business allows the business 202 to initially focus only on those candidates who will readily provide them with the best reach for their specific use.

Figure 6A:
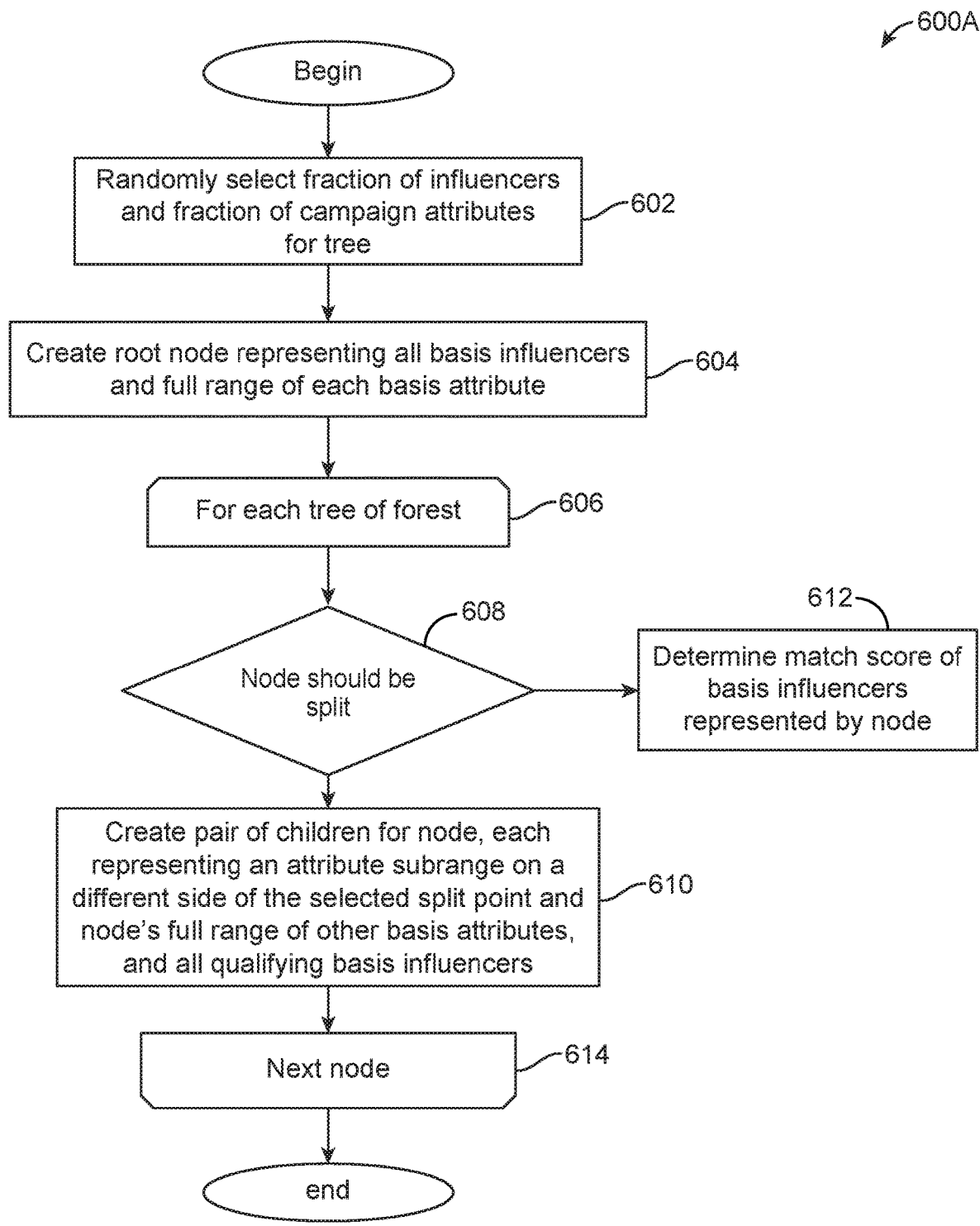
FIG. 6A is a flow diagram showing steps typically performed by the facility in order to construct a tree, in accordance with one embodiment of the present invention.

Referring now to FIG. 6A, a flow diagram showing steps typically performed by the system in order to construct a tree in accordance with one embodiment of the present invention, is presented generally at 600A. In step 602, the system randomly selects a fraction of the influencers to which the tree corresponds, as well as a fraction of the available campaign attributes, as a basis for the tree. In step 604, the system creates a root node for the tree that represents all of the basis influencers and the full range of each of the basis campaign attributes. In steps 606-614, the system loops through each node of the tree, including both the root node created in step 604 and any additional nodes added to the tree in step 610. In step 608, if it is possible to "split" the node, i.e., create two children of the node each representing a different subrange of an attribute value range represented by the node, then the system continues in step 610, else the system continues in step 612. The way a system determines whether and how to split a node is now discussed with reference to FIG. 6B.

Figure 6B:
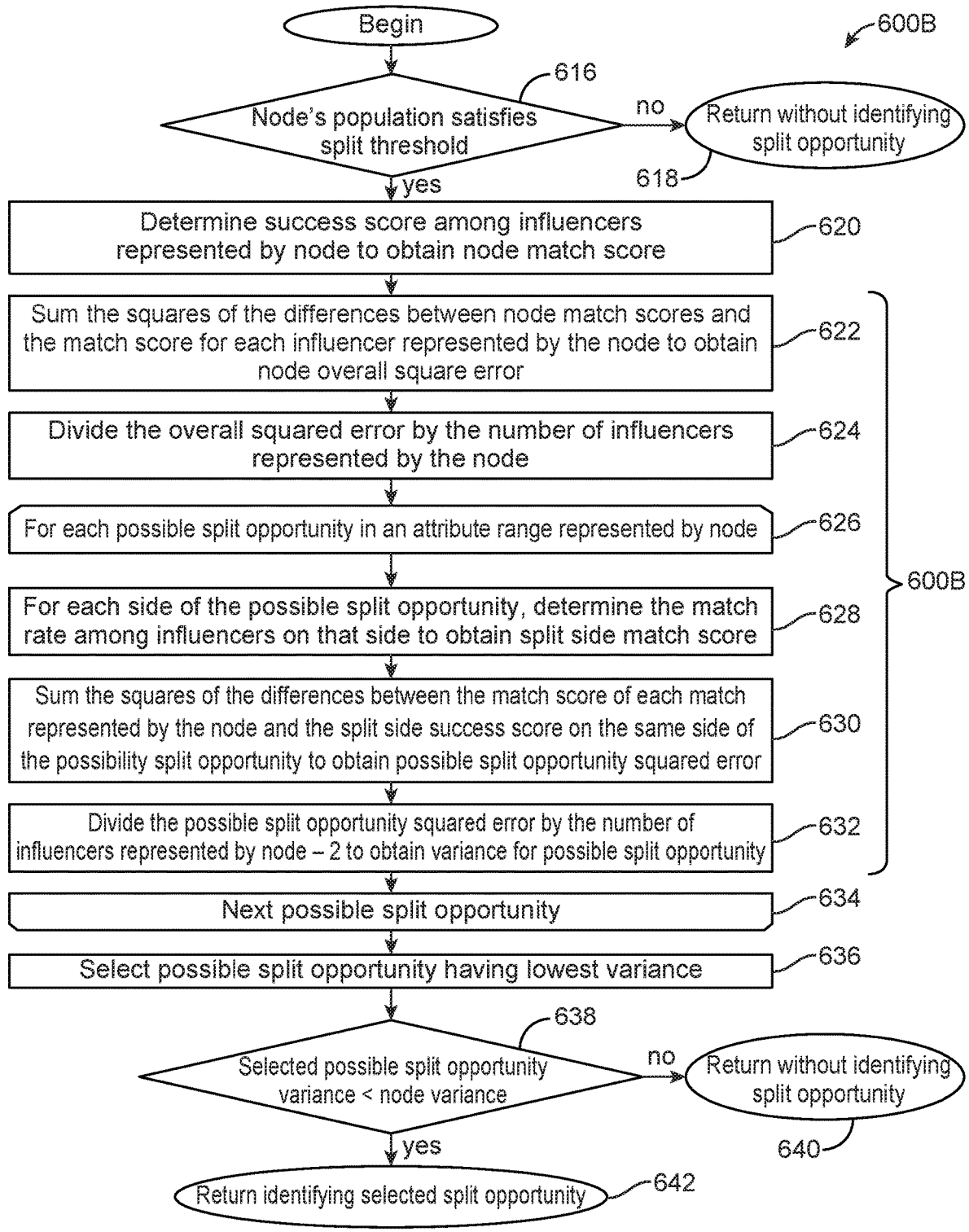
FIG. 6B is a flow diagram showing steps typically performed by the system in order to determine whether and how to split a node of a tree, in accordance with one embodiment of the present invention.

Referring now to FIG. 6B, a flow diagram showing steps typically performed by the system in order to determine whether and how to split a node of a tree in accordance with one embodiment of the present invention, is presented generally at 600B. These steps generally identify a potential split opportunity having the highest information gain, and determine whether the information gain of that potential split opportunity exceeds the information gain of the current node. In step 616, the system determines whether the node's population—that is, the number of basis videos represented by the node—satisfies a split threshold, such as a split that requires more than three basis videos. If the threshold is not satisfied, then the system returns to step 608 in step 618 without identifying any split opportunity, such that the facility will not split the node; otherwise, the facility continues in step 620. Though not shown, the system may apply a variety of other tests to determine whether the node should be split, including whether any of the selected attribute ranges represented by the node is divisible. For example, where the selected attributes are number of followers and number of likes per post, a node represents the ranges number of followers=5 and number of likes per post=no, none of the node's selected attribute ranges can be split.

Still referring to FIG. 600B, in steps 626-636, the system analyzes the characteristic of each possible split opportunity that exists in the node; that is, for each attribute range represented by the node, any point at which that range could be divide. In step 626, the system determines if there are additional possible split opportunities in the attribute range represented by the node. Then in step 628, for each side of the possible split opportunity, the system determines the match score among influencers on that side to obtain a split side success score. In step 630, the system sums the squares of the differences between the success score of each video represented by the node and split the side mean match score on the same side of the possible split opportunity to obtain a possible split opportunity squared. In step 632, the system divides the possible split opportunity squared error by two less than the number of influencers represented by the node to obtain a variance for the possible split opportunity. In step 634, if another possible split opportunity remains to be processed, then the facility continues in step 634 to process the next possible split opportunity, else the system continues to step 636.

Still referring to FIG. 600B, in steps 628-636, the system analyzes the characteristic of each possible split opportunity that exists in the node; that is, for each attribute range represented by the node, any point at which that range could be divide. In step 628, for each side of the possible split opportunity, the system determines the match score among influencers on that side to obtain a split side success score. In step 630, the system sums the squares of the differences between the success score of each video represented by the node and split the side mean match score on the same side of the possible split opportunity to obtain a possible split opportunity squared. In step 632, the system divides the possible split opportunity squared error by two less than the number of influencers represented by the node to obtain a variance for the possible split opportunity. In step 634, if another possible split opportunity remains to be processed, then the facility continues in step 634 to process the next possible split opportunity, else the system continues to step 636.

Still referring to FIG. 600B, in step 636 the system selects the possible split opportunity having the lowest variance. In step 640, if the selected possible split opportunity variance determined in step 638 is less than the node variance determined in step 624, then the system continues in step 640, else the system continues in step 642 to return, identifying the split opportunity selected in step 638 to return without identifying a split opportunity.

Returning to FIG. 600A, in step 610, when the steps shown in FIG. 600B determine that the node should be split, the system creates a pair of children for the node. Each child represents one of the subranges of the split opportunity identified in step 608 and the node's full range of unselected attributes. Each child represents all basis influencers whose attributes satisfy the attribute ranges represented by the child. In step 612, because the node will be a leaf node, the system determines the match score of basis influencers represented by the node. In step 614, the system processes the next node of the tree. After step 614, these steps concluded.

Figure 7:
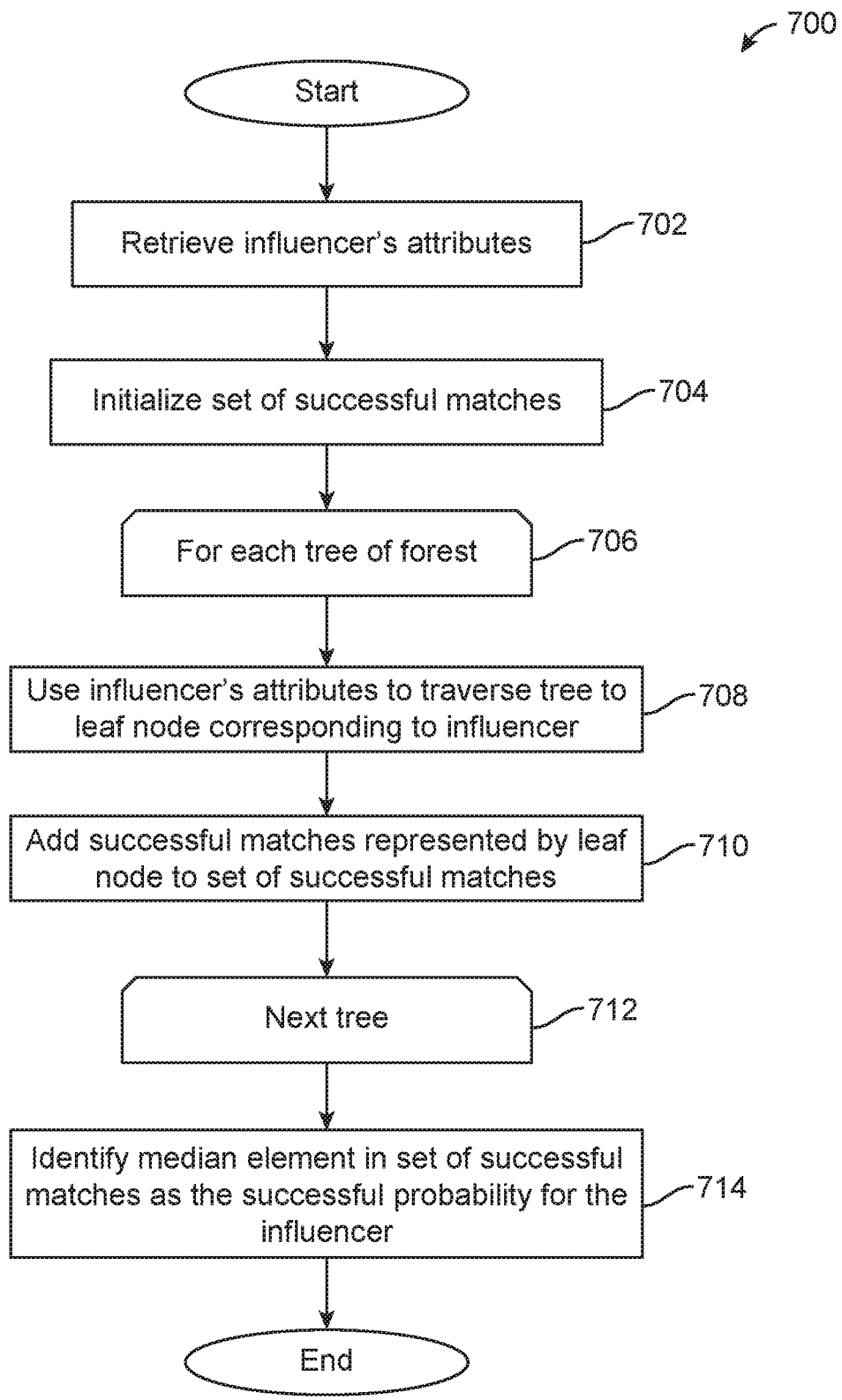
FIG. 7 shows the steps typically performed by the system in order to apply a forest of decision trees to obtain a ranking for a specific influencer, in accordance with one embodiment of the present invention.

Referring now to FIG. 7, a flow diagram showing the steps typically performed by the system in order to apply a forest of trees to obtain a match score for an influencer in accordance with one embodiment of the present invention, is presented generally at 700. In step 702, the system retrieves the attributes for a particular influencer. In step 704, the system initializes a set of successful match attributes. In steps 706-712, the system loops through each tree of the forest. In step 708, the system uses the influencer's attributes retrieved in step 702 to traverse the tree to a leaf corresponding to the influencer and its attributes. In step 710, the system copies from the leaf node traversed-to in step 708, the list of the successful matches represented by the leaf node. In step 712, if additional trees of the forest remain to be processed, then the system continues in step 706 to process the next tree, else the system in step 714. In step 714, the system identifies as its success probability for the influencer a median element in the set of success matches accumulated in step 710.

Specific configurations and arrangements of the invention, discussed above regarding the accompanying drawing, are for illustrative purposes only. Other configurations and arrangements that are within the purview of a skilled artisan can be made, used, or sold without departing from the spirit and scope of the invention. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures.

While the present invention has been described in connection with what are presently considered to be the most practical and preferred embodiments, it is to be understood that the present invention is not limited to these herein disclosed embodiments. Rather, the present invention is intended to include the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including," "comprising," "having," and "with" as used herein are to be interpreted broadly and comprehensively, and are not limited to any physical interconnection. Moreover, any embodiments disclosed herein are not to be interpreted as the only possible embodiments. Rather, modifications and other embodiments are intended to be included within the scope of the appended claims.

We claim:

1. A non-transitory computer readable storage media having computer-executable instructions, when executed by a processor, performs a method for evaluating a reach of a social media influencer, the instructions comprising:
   receiving data pertaining to a plurality of influencers at a server, wherein a data set is associated with each of the plurality of influencers;
   parsing the data set into quantitative data readable by a machine learning algorithm at the server;
   receiving, inputting, or both, a type of good or service at the server;
   classifying the type of good or service into at least one class of goods or services;
   training a node using the machine learning algorithm using the data set as an input;
   executing the machine learning algorithm to determine a score of each influencer for each class of goods or services;
   wherein the data set comprises:
   a first quantitative data set that directly corresponds to distribution potential, wherein distribution potential comprises a number of followers and number of times the influencer is mentioned in other posts;
   a second date set that corresponds directly to engagement and interaction potential, wherein the engagement and interaction potential comprises comments within the influencers direct connections;
   a third data set that corresponds directly to influence potential, wherein influence potential comprises shares of the influencer's conversation;
   a fourth data set that corresponds directly to creative information, wherein creative information comprises content posted; and
   a fifth data set that corresponds directly to influencer personal information;
   wherein the step of scoring the influencer comprises using the quantitative data sets.

2. The method of claim 1, wherein the machine learning algorithm comprises random forest, and the method further comprises:
   constructing a training data set from the data sets associated with each influencer, wherein the training data set comprises results of previous campaigns in at least one of the class of goods or services;

analyzing the training data set input into the server;
generating a forest of decision trees based on the training data set;
receiving additional influencers on to the server, wherein the additional influencers have respective data sets associated with them;
executing the machine learning algorithm to determine a score of each additional influencer as it relates to each class of goods or services;
prioritizing the influencers, additional influencers, or both, for each of the classes of goods or services that most are likely to have the highest influence in that class of goods or services.

3. The method of claim 2, wherein training the node generating a forest of decision trees further comprises:
inputting a historical data set for the influencers that are known to have successful campaigns in the class based upon known commercial success;
inputting the data set associated with the additional influencer;
generating vector spaces that correspond the input of the historical data set and the data set associated with the additional influencer;
running the data associated with the additional influencer through the forest of decision trees;
comparing the additional influencer data to the previous influencer data, and grouping the additional influencer data in the vector space that relates to a probabilistic level of success the influencer, additional influencer, or both may have with respect to the class of goods or service;
bagging the additional influencer data and continuously running further additional influencers through the node to increase efficacy;
wherein the score for each influencer ranges from 0.0 to 1.0 for each class of goods or services.

4. The method of claim 2, wherein generating a forest of decision trees comprises generating an ensemble of a plurality of randomly trained decision trees, wherein each of the decision trees are split into subsets based on an attribute value test, and each of the additional influencers are given the score based on the value test.

5. The method of claim 1, wherein classifying the goods or services into at least one of a plurality of classes comprises grouping businesses together with common-type good, services, or both, and generating sectors of classes.

6. The method of claim 1, wherein:
wherein the engagement and interaction potential further comprises likes, social media shares, forwarding, reviews, check-ins, contributors and active contributors, clicks on page views, unique visitors from social media, sessions from social networking sites time spent thereon, and average response times;
wherein influence potential further comprises historical data based on businesses for which the influencer has acted as an influencer for or has otherwise advocated for, the satisfaction of any of its followers from such other businesses it has acted as an influencer for or has otherwise advocated for;
wherein creative information further comprises social causes, and subjective brand relation.

7. The method of claim 1, further comprising comparing each of the quantitative data sets with a predetermined range of data gathered from the machine learning algorithm to assess the probability of success of a campaign with the influencer or additional influencer in the class of goods or services.

8. The method of claim 1, further comprising:
receiving a request from a third party at the server to place an influencer for its good or service, and to set up a campaign using the influencer, wherein the data from the campaign is stored on the server.

9. The method of claim 1, wherein the at least one node is a plurality of nodes that are self-tuning.

10. The method of claim 8, wherein once the campaign is complete, the campaign data is run through the machine learning algorithm to increase efficacy.

* * * * *